United States Patent
Kwak et al.

(10) Patent No.: US 7,838,455 B2
(45) Date of Patent: Nov. 23, 2010

(54) METHOD OF REGENERATION OF TITANIUM-CONTAINING MOLECULAR SIEVE CATALYST

(75) Inventors: Byong Sung Kwak, Daejeon (KR); Seung Hoon Oh, Daejeon (KR); Tae Jin Kim, Daejeon (KR); Dae Hyun Choo, Busan (KR); Young Min Chung, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 0 days.

(21) Appl. No.: 11/995,266

(22) PCT Filed: Jun. 26, 2006

(86) PCT No.: PCT/KR2006/002455

§ 371 (c)(1),
(2), (4) Date: Jan. 10, 2008

(87) PCT Pub. No.: WO2007/013739

PCT Pub. Date: Feb. 1, 2007

(65) Prior Publication Data

US 2009/0018291 A1   Jan. 15, 2009

(30) Foreign Application Priority Data

Jul. 27, 2005   (KR) .............. 10-2005-0068302

(51) Int. Cl.
*B01J 38/48* (2006.01)
*B01J 38/52* (2006.01)
(52) U.S. Cl. .............. 502/25; 502/22; 502/29
(58) Field of Classification Search ............ 502/22, 502/25, 29
See application file for complete search history.

(56) References Cited

U.S. PATENT DOCUMENTS

| | | | |
|---|---|---|---|
| 4,410,501 A | 10/1983 | Taramasso et al. | |
| 5,620,935 A | 4/1997 | Thiele | |
| 5,646,314 A | 7/1997 | Crocco et al. | |
| 5,741,749 A | 4/1998 | Crocco et al. | |
| 5,753,576 A | 5/1998 | Crocco et al. | |
| 5,859,265 A * | 1/1999 | Muller et al. | 549/531 |
| 5,912,367 A * | 6/1999 | Chang | 549/529 |
| 5,916,835 A | 6/1999 | Carroll et al. | |
| 6,037,484 A | 3/2000 | Grey | |
| 6,063,941 A | 5/2000 | Gilbeau | |
| 6,066,750 A | 5/2000 | Chang | |
| 6,169,050 B1 | 1/2001 | Catinat et al. | |
| 6,288,004 B1 | 9/2001 | Balducci et al. | |
| 6,372,924 B2 | 4/2002 | Thiele et al. | |
| 6,380,119 B1 | 4/2002 | Grosch et al. | |
| 6,403,514 B1 | 6/2002 | Mantegazza et al. | |
| 6,790,969 B2 | 9/2004 | Muller et al. | |
| 2005/0277542 A1 | 12/2005 | Kaminsky et al. | |

FOREIGN PATENT DOCUMENTS

EP   1489074   12/2004

OTHER PUBLICATIONS

G.F. Thiele et al., Propylene epoxidation with hydrogen peroxide and titanium silicate catalyst: Activity, deactivation and regeneration of the catalyst. Journal of Molecular Catalysis A: Chemical 117, 351-356 (1997).

* cited by examiner

*Primary Examiner*—Elizabeth D Wood
(74) *Attorney, Agent, or Firm*—McDermott Will & Emery LLP

(57) ABSTRACT

Disclosed herein is a method of regenerating a titanium-containing molecular sieve catalyst. Particularly, this invention provides a method of regenerating a titanium-containing molecular sieve catalyst used in epoxidation of olefin through simple treatment using a mixture solvent comprising aqueous hydrogen peroxide and alcohol. According to the method of this invention, when the catalyst having decreased activity is regenerated, the activity of the regenerated catalyst is equal to that of new catalyst and can be maintained stable for a long period of time.

9 Claims, No Drawings

METHOD OF REGENERATION OF TITANIUM-CONTAINING MOLECULAR SIEVE CATALYST

This application is a National Stage Application under 35 U.S.C. §371 of PCT International Application No. PCT/KR2006/002455, filed Jun. 26, 2006, and claims priority of Korean Patent Application No. 10-2005-0068302, filed Jul. 27, 2005.

TECHNICAL FIELD

The present invention relates, generally, to a method of regenerating a titanium-containing molecular sieve catalyst, and more particularly, to a method of regenerating a titanium-containing molecular sieve catalyst used in epoxidation of olefin through simple treatment using a mixture solvent comprising aqueous hydrogen peroxide and alcohol, in which the activity of the regenerated catalyst is equal to that of new catalyst and is maintained stable for a long period of time.

BACKGROUND ART

In general, a titanium-containing molecular sieve catalyst is used in the conversion of saturated hydrocarbon to alcohol or ketone or in the hydroxylation of an aromatic compound, and also has high activity in the epoxidation of olefin using hydrogen peroxide. However, it is known that the titanium-containing molecular sieve catalyst rapidly becomes inactivated due to poisoning. Thus, in order to apply the epoxidation process of an olefin compound through reaction with hydrogen peroxide in the presence of a titanium-containing molecular sieve catalyst to the commercial preparation of olefin oxide or epoxide, a catalyst regeneration technique, which enables the repeated use of the catalyst, is essentially required along with reaction and process techniques for the prevention of rapid inactivation. Accordingly, various techniques related to the catalyst regeneration method have been proposed.

Particularly, a method of regenerating a titanium-containing molecular sieve catalyst is largely based on a calcination process and a solvent washing process. The calcination process is a typical catalyst regeneration technique, which is disclosed in U.S. Pat. Nos. 5,753,576, 5,741,749, 6,169,050, 6,380,119, and 6,790,969. Upon use of the calcination process, deposited carbon material is burned at a high temperature or thermally cracked to remove it, thus regenerating the catalyst. However, the above process deforms the catalyst due to the reaction at a high temperature and is difficult to apply to a reactor, such as a multi-tubular reactor or a jacket reactor. Hence, thorough research into catalyst regeneration methods using a solvent washing process has been conducted in recent years.

U.S. Pat. No. 5,916,835 discloses a method of regenerating an inactivated catalyst through a washing process using various solvents. According to this patent, in the case where the solvent washing process is conducted using methanol at 50~250° C. for 0.5~12 hours, the best catalyst regeneration effect can result. However, the above method suffers because a calcination step using oxygen at 400~900° C. is additionally required, and whether the activity of the regenerated catalyst is maintained for a long period of time is not confirmed.

In order to increase catalyst regeneration efficiency and decrease the regeneration period, U.S. Pat. No. 6,066,750 discloses a method of regenerating a catalyst comprising adding ammonium or an alkali metal cation to methanol to regenerate a catalyst at 150~250° C. However, in the case where the metal ion remains in the reactor after the catalyst regeneration process, it functions as an impurity and the used solvent is difficult to recover.

U.S. Pat. No. 6,063,941 discloses a catalyst regeneration method, in which the catalyst may be efficiently regenerated through a washing process that uses methanol and then 2~5 wt % aqueous hydrogen peroxide having a pH of 4~7, adjusted with sodium hydroxide (NaOH), at 50~100° C. However, the result of the regeneration of the catalyst is not specifically described.

U.S. Pat. No. 6,403,514 discloses a catalyst regeneration method using 30 wt % aqueous hydrogen peroxide added with a fluorinated inorganic compound. However, after the regeneration of the catalyst, a calcination step using air or oxygen at 400~600° C. is essentially required to remove the ion. In addition, although at least 80% of initial catalytic activity is reportedly restored, whether the activity of the regenerated catalyst is maintained for a long period is not mentioned.

Further, the method of regenerating a catalyst using aqueous hydrogen peroxide as an oxidant is also disclosed in U.S. Pat. No. 5,620,935, in which the maintenance of the reaction temperature near the boiling point of hydrogen peroxide is noted to be important for the regeneration of the catalyst. However, as the result of the regeneration, only the restoration of the initial catalytic activity is mentioned, and whether the activity of the regenerated catalyst is maintained for a long period of time is not confirmed.

European Patent No. 1,489,074 discloses a catalyst regeneration method using a methanol washing process, which is characterized in that methanol used for catalyst regeneration is recovered after a lapse of time equal to 2~30% of the total time required for the regeneration process. As such, the catalyst thus regenerated is active for a long period of time of 300 hours or more. However, the catalyst regeneration method using the solvent alone is effective only in cases of partial inactivation. In the cases of considerable inactivation or drastic decrease in the activity of the catalyst due to a problem with the reactor, even though the catalyst is regenerated, the activity thereof is difficult to restore to a predetermined level or higher.

DISCLOSURE

Technical Problem

Leading to the present invention, intensive and thorough research on catalyst regeneration methods, carried out by the present inventors aiming to avoid the problems encountered in the prior art, led to the development of a method of regenerating a titanium-containing molecular sieve catalyst, in which the inactivated titanium-containing molecular sieve catalyst is treated with a specific mixture solvent, such that the catalyst can be easily regenerated without the problem of deformation of the catalyst, use of other additives or additional procedures such as controlling the acidity, and as well, the activity of the regenerated catalyst is equal to that of new catalyst and is maintained stable for a long period of time.

Accordingly, an object of the present invention is to provide a method of regenerating a titanium-containing molecular sieve catalyst, in which oxidized and decomposed deposits present in pores of the molecular sieve catalyst are treated with a mixture solvent comprising aqueous hydrogen peroxide and alcohol, thereby effectively removing the deposits from the pores, resulting in an excellent catalyst regeneration effect.

Technical Solution

In order to accomplish the above object, the present invention provides a method of regenerating a titanium-containing molecular sieve catalyst, comprising i) pretreating the titanium-containing molecular sieve catalyst, which has been used in epoxidation of an olefin compound and thus inactivated, with water or alcohol, thus washing residual reaction materials and impurities; and ii) bringing the pretreated catalyst into contact with a mixture solution comprising hydrogen peroxide, water, and alcohol, thus regenerating the catalyst.

In addition, the present invention provides a method of epoxidation of olefin, comprising regenerating a catalyst using the above method.

Advantageous Effects

According to the method of the present invention, when the titanium-containing molecular sieve catalyst used in the epoxidation of olefin using hydrogen peroxide is regenerated using a mixture solvent comprising aqueous hydrogen peroxide and alcohol, deposits present in pores of the catalyst can be efficiently removed without the use of an additive or without the need for an additional process such as controlling a pH. As well, after the completion of the reaction, the original activity of the catalyst can be restored, and the activity of the catalyst can be maintained stable for a long period of time.

BEST MODE

Hereinafter, a detailed description will be given of the present invention.

The molecular sieve catalyst, to which the regeneration method of the present invention is applied, is a titanium-containing molecular sieve catalyst widely used in oxidation of olefin and hydrogen peroxide, and is represented by Formula I below:

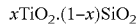 Formula I wherein x is a real number from 0.001 to 0.05.

Specific examples of the titanium-containing catalyst include titanium silicalite-1 (TS-1) and titanium silicalite-2 (TS-2). Preferably, crystalline titanium-containing zeolite, having an MFI or MEL crystal structure, is used. In particular, titanium silicalite-1, having an MFI crystal structure, is more preferable. Such titanium-containing zeolite may be prepared through various methods disclosed in U.S. Pat. Nos. 4,410,501, 5,646,314, 6,037,484, and 6,372,924.

The titanium silicalite catalyst may be provided in the form of powder, granules, extrudate, tablets, spheres, pellets or other physical shapes, depending on the end use thereof. In addition, the titanium silicalite catalyst may be molded after being mixed with a binder upon epoxidation, if necessary. The type of binder is not particularly limited, and any binder may be used so long as it does not react with hydrogen peroxide or an olefin oxide product under reaction conditions for epoxidation. Further, a molding process widely known in the art may be applied. Preferably, the binder is selected from the group consisting of amorphous silica, alumina, silica-alumina, titania, and zirconia. More preferably, silica or alumina may be used. In such a case, the binder is contained in the catalyst in an amount of about 5~95 wt %, and preferably about 1050 wt %.

The epoxidation of olefin using the titanium-containing molecular sieve catalyst may be conducted by reacting a predetermined amount of an olefin compound with hydrogen peroxide in the presence of the above catalyst as typically known in the art.

The olefin compound used in the epoxidation of the present invention has at least one double bond and may be a cyclic, branched or linear type. Typically, C2~C10 aliphatic olefin compounds, more specifically, ethylene, propylene, 1-butene, 2-butene, 1-octene, cyclohexene, cyclooctene, etc., may be used. Preferably, C2~C6 aliphatic olefins are useful. More preferably, propylene is used in the epoxidation of the present invention. In the case of propylene, it may be supplied in the form of liquid or gas into a reaction system. Pure propylene or a mixture with less than 10% propane may be used.

In addition, hydrogen peroxide, which reacts with the olefin compound upon the epoxidation of the present invention, is typically used in the form of an aqueous solution. Preferably, as an aqueous solution of 1~90 wt % and preferably 5~70 wt % hydrogen peroxide, both a hydrogen peroxide solution added with a commercially available stabilizer and a crude hydrogen peroxide solution without an added stabilizer may be employed in the present invention.

In the epoxidation of the present invention, olefin is preferably used in an excess amount to realize high conversion of hydrogen peroxide. Thus, the molar ratio of hydrogen peroxide to olefin is about 1 or higher, and preferably about 1~10.

In the epoxidation of the present invention, the reaction conditions are preferably controlled so as to efficiently convert hydrogen peroxide as quickly as possible in consideration of various factors. For example, under conditions of a temperature of about 0~100° C., and preferably about 20~60° C., and of a pressure ranging from atmospheric pressure to 100 atm, and preferably from atmospheric pressure to 30 atm, the catalyst is added or loaded in an appropriate amount to convert 90% or more of hydrogen peroxide within the selected reaction time or resident time, if necessary. Such conditions may be determined based on the amount of catalyst per 1 mole olefin (e.g., in the case of a batch reaction mode) or based on a space velocity (e.g., in the case of a continuous reaction mode) by those skilled in the art, if necessary. In particular, the specific reaction conditions are determined within a range capable of minimizing the decomposition of hydrogen peroxide and additional conversion of an olefin oxide product into a by-product. Moreover, in the case where olefin, such as propylene, present in a gas phase at atmospheric pressure is used as reaction material, the pressure in the reactor should be preferably maintained at atmospheric pressure or higher such that propylene is contained in the liquid in a desired concentration.

For the epoxidation of the present invention, a batch reactor, a semi-batch reactor, or a continuous reactor may be used without particular limit. The continuous reactor may be effectively used from the point of view of minimizing the contact time with the catalyst so as not to convert olefin oxide, resulting from epoxidation, into an additional by-product, and of continuously removing the reaction products during the reaction, leading to a high reaction rate. More specifically, the epoxidation may be carried out by continuously supplying an aqueous hydrogen peroxide solution, a solvent and olefin alone or in a combination thereof, as a reaction medium, to a tubular reactor allowing reaction material to flow in a fixed bed of the catalyst or a reactor using liquid slurry.

In the method of regenerating the titanium-containing molecular sieve catalyst having decreased catalytic activity due to the use in the epoxidation of the olefin compound, a first step is a pretreatment step of washing the catalyst, which has catalytic activity decreased to a predetermined level or less or is inactivated due to use in the oxidation of olefin, using water or alcohol.

In the case of a batch reactor, when the reaction is completed, the reactor is disassembled, after which the catalyst is recovered and thus washed with water or alcohol. On the other hand, in the case of a continuous reactor, after the completion of the reaction, the catalyst may be regenerated without being removed from the reactor. When the activity of the catalyst is decreased to a predetermined level or less, the catalyst washing process is conducted in a manner such that the reaction medium comprising the aqueous hydrogen peroxide solution, the solvent, and olefin is not supplied and the water or alcohol is allowed to flow in the reactor. Although the reaction conditions are not particularly limited in the pretreatment step, the washing process is efficiently conducted at a flow rate of 0.1~10 cc/min, and preferably 0.5~4 cc/min, under conditions of a temperature of 0~60° C., and preferably 30~50° C. and of a pressure ranging from atmospheric pressure to 100 atm, and preferably from atmospheric pressure to 30 atm.

After the completion of the pretreatment step, a catalyst regeneration step is performed as a second step.

That is, the catalyst is regenerated using the mixture solution comprising alcohol and hydrogen peroxide mentioned above.

As alcohol, any alcohol may be used so long as it may maintain a liquid phase and may be mixed with water. Preferably, C1~C10 alcohols, and more preferably, methanol, ethanol, propanol, or butanol may be effectively used. In particular, methanol is most preferably used. In addition, alcohol and water are mixed at a volume ratio of 1:10~10:1, and preferably 1:2~2:1.

Hydrogen peroxide may be used in a concentration of 0.1~40 wt %, preferably 0.5~20 wt %, and more preferably 1~10 wt %, based on the aqueous solution containing alcohol.

In the case of using the batch reactor, the catalyst recovered from the pretreatment process is added to the mixture solution and is then stirred at a predetermined temperature for a predetermined period of time. For example, under conditions of a temperature of about 60~200° C., and preferably about 120~150° C. and of a pressure of about 5~50 atm, and preferably about 5~30 atm, a stirring process may be conducted for about 1~48 hours, preferably about 4~24 hours, and more preferably 6~12 hours. Thereafter, the regenerated catalyst is washed again with alcohol or water, dried, and then used for reaction.

In the case of using the continuous reactor, the catalyst is not removed from the reactor in order to be subjected to a regeneration process, after the completion of the reaction. The continuous reaction is conducted under conditions similar to those of the batch reaction. That is, the continuous reaction may be carried out by passing a mixture solution comprising aqueous hydrogen peroxide and alcohol through the catalyst bed in the continuous reactor at a flow rate of 0.1~10 cc/min, and preferably 0.5~4 cc/min in the temperature range of 25~200° C. When the regeneration process is completed, alcohol or water is allowed to flow in the reactor to wash the catalyst again. This washing process is conducted at a flow rate of about 0.1~10 cc/min, and preferably 0.5~4 cc/min under conditions of a temperature of 0~60° C., and preferably about 30~50° C., and of a pressure ranging from atmospheric pressure to 100 atm, and preferably from atmospheric pressure to 30 atm. The period of time required for the washing process may vary with the amount of the catalyst. For example, the washing process is conducted within about 5 hours, and preferably about 2 hours.

After the completion of the catalyst regeneration procedure of the present invention, the reaction medium comprising the aqueous hydrogen peroxide solution, the solvent, and olefin may be supplied again into the reactor for the epoxidation.

In the present invention, after the completion of epoxidation, the intended olefin oxide component may be separated and recovered through a process typically used in the art, and the present invention is not limited to particular separation and recovery processes.

MODE FOR INVENTION

A better understanding of the present invention may be obtained in light of the following examples which are set forth to illustrate, but are not to be construed to limit the present invention.

EXAMPLE 1

Epoxidation was conducted using a silicalite catalyst (1.35 wt % titanium). Through epoxidation for a long period of time, when the catalyst was inactivated and thus the activity thereof was decreased to a predetermined level or less, a reaction medium comprising an aqueous hydrogen peroxide solution, a solvent and propylene was not supplied, and a pretreatment process was conducted at a flow rate of 1 cc/min for 2 hours under conditions of 40° C. and 16 bar using methanol to wash residual reaction materials and impurities. As soon as the completion of the pretreatment process, a catalyst regeneration process was conducted using a mixture solution composed of aqueous hydrogen peroxide and methanol. The washing solution used for the catalyst regeneration process was prepared by mixing methanol and water at a volume ratio of 1:1 and using aqueous hydrogen peroxide having a concentration of 2 wt % based on the total weight of the solvent. The catalyst regeneration process was carried out at a flow rate of 2 cc/min for 6 hours under conditions of 150° C. and 16 bar using a mixture solution comprising aqueous hydrogen peroxide and methanol. Thereafter, a post-treatment process was conducted using methanol under the conditions equal to those of the pretreatment process, followed by a drying process using nitrogen for 2 hours, after which the regenerated catalyst was recovered. Through elemental analysis, variation in the amount of carbon deposited on the catalyst before and after the catalyst regeneration process was observed. The results are shown in Table 1 below.

COMPARATIVE EXAMPLE 1

The catalyst was regenerated in the same manner as in Example 1, with the exception that a mixture solvent comprising methanol and water mixed at a volume ratio of 1:1 was prepared and used as the washing solution for catalyst regeneration. Variation in the amount of carbon deposited on the catalyst before and after the catalyst regeneration process was observed. The results are shown in Table 1 below.

COMPARATIVE EXAMPLE 2

The catalyst was regenerated in the same manner as in Example 1, with the exception that methanol was used as the washing solution for catalyst regeneration. Variation in the amount of carbon deposited on the catalyst before and after the catalyst regeneration process was observed. The results are shown in Table 1 below.

COMPARATIVE EXAMPLE 3

The catalyst was regenerated in the same manner as in Example 1, with the exception that 2 wt % aqueous hydrogen peroxide was used as the washing solution for catalyst regeneration. Variation in the amount of carbon deposited on the catalyst before and after the catalyst regeneration process was observed. The results are shown in Table 1 below.

TABLE 1

| | Washing Agent | Residual Carbon (%) |
|---|---|---|
| Ex. 1 | 2 wt % aq. $H_2O_2$/Methanol | 17 |
| C. Ex. 1 | Methanol/Water | 47 |
| C. Ex. 2 | Methanol | 86 |
| C. Ex. 3 | 2 wt % aq. $H_2O_2$ | 33 |

As is apparent from Table 1, upon removal of the organic material deposited on the catalyst, the use of hydrogen peroxide as the oxidant was more efficient than the use of methanol or a mixture solution of methanol and water. That is, in the case where the mixture solution of Example 1 was used, the efficiency of removal of the deposited material was excellent.

EXAMPLE 2

The catalyst was regenerated in the same manner as in Example 1, with the exception that the catalyst regeneration process was conducted at 120° C. Variation in the amount of carbon deposited on the catalyst before and after the catalyst regeneration process was observed. The results are shown in Table 2 below.

EXAMPLE 3

The catalyst was regenerated in the same manner as in Example 1, with the exception that the catalyst regeneration process was conducted at 90° C. Variation in the amount of carbon deposited on the catalyst before and after the catalyst regeneration process was observed. The results are shown in Table 2 below.

EXAMPLE 4

The catalyst was regenerated in the same manner as in Example 1, with the exception that the catalyst regeneration process was conducted at 60° C. Variation in the amount of carbon deposited on the catalyst before and after the catalyst regeneration process was observed. The results are shown in Table 2 below.

TABLE 2

| | Temperature (° C.) | Residual Carbon (%) |
|---|---|---|
| Ex. 1 | 150 | 17 |
| Ex. 2 | 120 | 18 |
| Ex. 3 | 90 | 46 |
| Ex. 4 | 60 | 48 |

As is apparent from Table 2, when the temperature was high, the amount of organic material deposited on the catalyst was decreased.

COMPARATIVE EXAMPLE 4

The catalyst was regenerated in the same manner as in Example 1, with the exception that the catalyst regeneration process was conducted at atmospheric pressure. Variation in the amount of carbon deposited on the catalyst before and after the catalyst regeneration process was observed. The results are shown in Table 3 below.

TABLE 3

| | Reaction Pressure (bar) | Residual Carbon (%) |
|---|---|---|
| Ex. 1 | 16 | 17 |
| C. Ex. 4 | Atmospheric Pressure | 55 |

As is apparent from Table 3, when the reaction pressure was increased to maintain the washing solution in a liquid phase, the amount of organic material deposited on the catalyst was preferably decreased.

COMPARATIVE EXAMPLE 5

Methanol was mixed with 60 wt % of hydrogen peroxide, thus preparing a liquid reaction mixture having 8 wt % hydrogen peroxide. In addition, 3.7 g of titanium silicalite (1.35 wt % titanium) was loaded in a tubular fixed bed reactor the temperature of which was controllable using a water cooling jacket. Then, argon was allowed to flow at 80° C. for 6 hours at a rate of 50 cc/min, and the catalyst was dried. Subsequently, the temperature was decreased to 40° C. and the pressure was controlled to 16 bar. The liquid reaction mixture was allowed to flow at a WHSV (Weight Hourly Space Velocity) of 0.3 $h^{-1}$ relative to hydrogen peroxide, and propylene was supplied at a molar ratio of hydrogen peroxide to propylene of 3, and thus the reaction was conducted. The conversion of hydrogen peroxide and the selectivity of propylene oxide after 500 hours of the reaction are shown in Table 4 below.

EXAMPLE 5

The epoxidation was conducted in the same manner as in Comparative Example 5. Due to inactivation of the catalyst, when the activity of the catalyst was decreased to a predetermined level or less, the aqueous hydrogen peroxide solution and propylene were not supplied, and the catalyst regeneration process was conducted with the catalyst remaining in the reactor. The pretreatment process was carried out at a flow rate of 1 cc/min for 2 hours under conditions of 40° C. and 16 bar using methanol to wash residual reaction materials and impurities. The washing solution used for the catalyst regeneration process was prepared by mixing methanol and water at a volume ratio of 1:1 and using aqueous hydrogen peroxide having a concentration of 5 wt % based on the total weight of the solvent. The catalyst regeneration process was carried out by passing a mixture solution comprising aqueous hydrogen peroxide and methanol through the catalyst bed at a flow rate of 2 cc/min for 12 hours under conditions of 150° C. and 16 bar. Thereafter, a post-treatment process was conducted using methanol under conditions equal to those of the pretreatment process. After the completion of the catalyst regeneration process, the aqueous hydrogen peroxide solution and propylene were supplied again and epoxidation was conducted. The conversion of aqueous hydrogen peroxide and the selectivity of propylene oxide after 500 hours of epoxidation using the regenerated catalyst are shown in Table 4 below.

COMPARATIVE EXAMPLE 6

A series of steps of conducting epoxidation, regenerating a catalyst, and resuming epoxidation was continuously performed. The epoxidation was conducted in the same manner as in Comparative Example 5. The catalyst regeneration process was conducted under the conditions the same as those of Example 5 using a mixture solvent comprising methanol and water mixed at a volume ratio of 1:1. The conversion of aqueous hydrogen peroxide and the selectivity of propylene oxide after 136 hours of epoxidation using the regenerated catalyst are shown in Table 4 below.

COMPARATIVE EXAMPLE 7

A series of steps of conducting epoxidation, regenerating a catalyst, and resuming epoxidation was continuously performed. The epoxidation was conducted in the same manner as in Comparative Example 5. The catalyst regeneration process was conducted under the conditions the same as those of Example 5 using methanol. The conversion of aqueous hydrogen peroxide and the selectivity of propylene oxide after 75 hours of epoxidation using the regenerated catalyst are shown in Table 4 below.

COMPARATIVE EXAMPLE 8

A series of steps of conducting epoxidation, regenerating a catalyst, and resuming epoxidation was continuously performed. The epoxidation was conducted in the same manner as in Comparative Example 5. The catalyst regeneration process was conducted under the conditions the same as those of Example 5 using 5 wt % aqueous hydrogen peroxide. The conversion of aqueous hydrogen peroxide and the selectivity of propylene oxide after 100 hours of epoxidation using the regenerated catalyst are shown in Table 4 below.

TABLE 4

| | Washing Agent | Reaction Time (h) | Conversion of Hydrogen Peroxide (%)[1] | Selectivity of Propylene Oxide (%)[2] |
|---|---|---|---|---|
| Ex. 5 | 5 wt % aq. $H_2O_2$/Methanol | 500 | 85 | 95 |
| C. Ex. 5 | —[3] | 500 | 87 | 95 |
| C. Ex. 6 | Methanol/Water | 136 | 75 | 93 |
| C. Ex. 7 | Methanol | 75 | 77 | 91 |
| C. Ex. 8 | 5 wt % aq. $H_2O_2$ | 100 | 81 | 92 |

[1](amount of hydrogen peroxide reacted upon epoxidation/amount of hydrogen peroxide introduced into reactor) × 100
[2](mole number of produced propylene oxide/mole number of reacted hydrogen peroxide) × 100
[3]no treatment with washing agent Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of regenerating a titanium-containing molecular sieve catalyst, comprising:
   i) pretreating the titanium-containing molecular sieve catalyst, which has been used in epoxidation of an olefin compound and thus inactivated, with water or alcohol, thus washing residual reaction materials and impurities; and
   ii) passing through the pretreated catalyst a mixture solution comprising hydrogen peroxide, water, and alcohol, thus regenerating the catalyst under the condition of a temperature of 60~200° C. and a pressure of 5~50 atm, wherein the hydrogen peroxide in the mixture solution has a concentration of 0.1~40 wt% and the water and alcohol in the mixture solution have a volume ratio of 1:10~10:1.

2. The method according to claim 1, further comprising washing the regenerated catalyst with water or alcohol and then drying it, after regenerating the catalyst in ii).

3. The method according to claim 1, wherein the alcohol is selected from the group consisting of C1~C10 alcohols.

4. The method according to claim 3, wherein the alcohol is methanol, ethanol, propanol, or butanol.

5. The method according to claim 1, wherein the titanium-containing molecular sieve catalyst is a titanium-containing molecular sieve catalyst including silicalite.

6. The method according to claim 5, wherein the titanium-containing molecular sieve catalyst including silicalite is represented by Formula I below and has an MFI or MEL crystal structure:

$$x\text{TiO}_2(1-x)\text{SiO}_2 \qquad \text{Formula I}$$

wherein x is 0.001~0.05.

7. The method according to claim 1, wherein regenerating the catalyst in ii) is conducted at a flow rate of 0.1~10 cc/min for 1-48 hours.

8. The method according to claim 1, wherein regenerating the catalyst in ii) is conducted by passing the mixture solution through a catalyst bed under conditions of a temperature of 120~150° C. and a pressure of 530 atm.

9. The method according to claim 1, wherein, in a case where the epoxidation is conducted in, a continuous manner, pretreating the catalyst is conducted by introducing water or alcohol into a continuous reactor at a flow rate of 0.1~10 cc/min under conditions of a temperature of 0~60° C. and a pressure ranging from atmospheric pressure to 100 atm, and regenerating the catalyst is conducted by passing the mixture solution through a catalyst bed in the continuous reactor at a flow rate of 0.1~10 cc/min in a temperature range of 25~200° C.

* * * * *